UNITED STATES PATENT OFFICE.

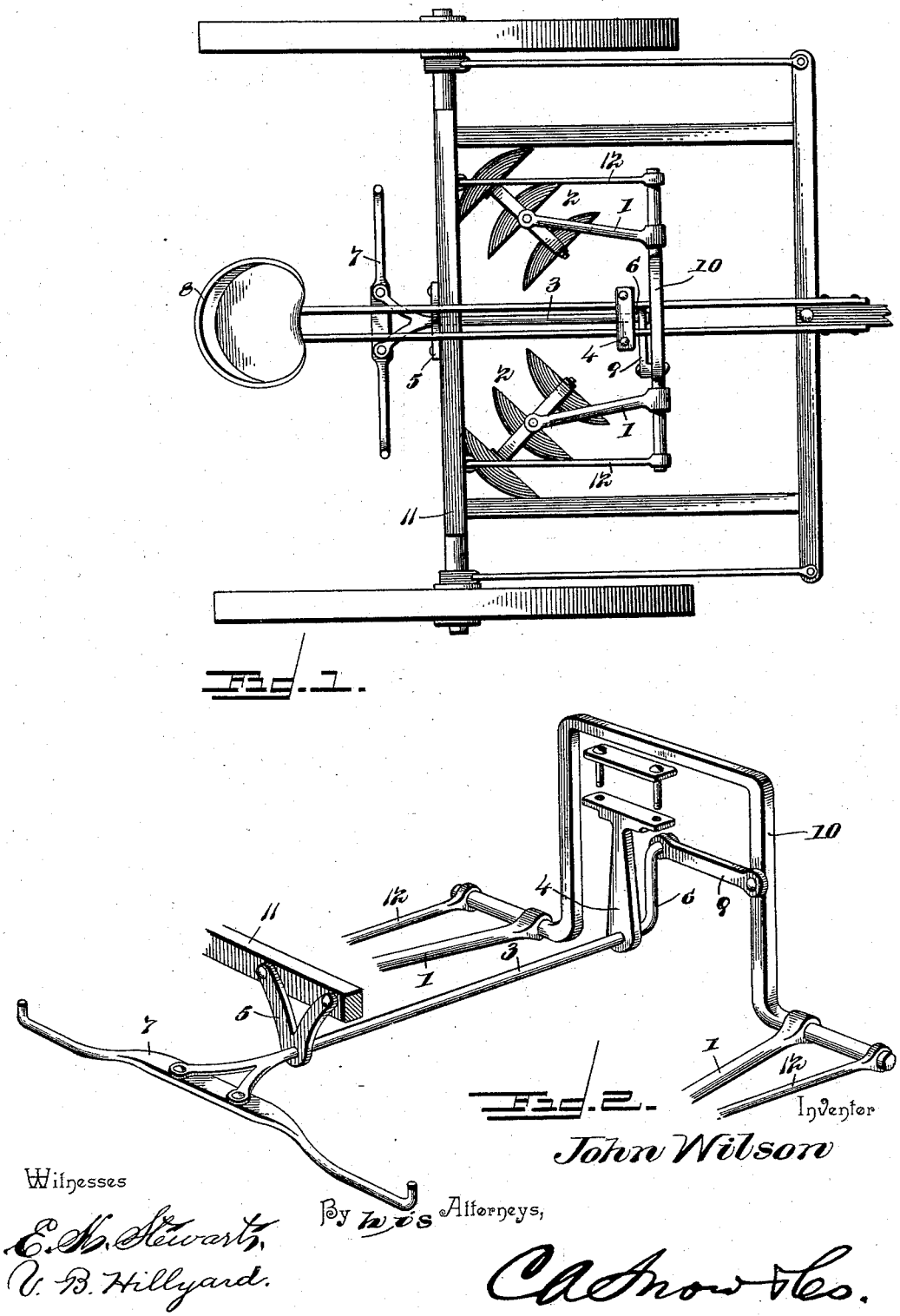

JOHN WILSON, OF CRESCO, IOWA, ASSIGNOR OF ONE-HALF TO H. BISHOP, OF SAME PLACE.

GUIDING ATTACHMENT FOR CULTIVATORS.

SPECIFICATION forming part of Letters Patent No. 580,631, dated April 13, 1897.

Application filed December 5, 1896. Serial No. 614,589. (No model.)

*To all whom it may concern:*

Be it known that I, JOHN WILSON, a citizen of the United States, residing at Cresco, in the county of Howard and State of Iowa, have invented a new and useful Guiding Attachment for Cultivators and Like Implements, of which the following is a specification.

This invention relates to riding-cultivators, plows, and like agricultural implements for tilling the soil, and is intended to leave the hands of the driver free for a proper management of the team and machine, the guiding of the cultivating-disks or equivalent devices being effected by the feet of the driver through a sway-bar, rock-shaft, and connections between the rock-shaft and the beams bearing the cultivating devices.

The principal object of the improvement is to provide means which can be applied to any wheel-cultivator without adding materially to the weight thereof and which will not present a cumbersome appearance, interfere with other parts, or be liable to derangement, and which will be effective for the purpose designed and not require the driver to touch the guiding mechanism with his hands to effect a proper steering and lateral movement of the cultivating devices to follow any irregularities of the rows or to dodge and avoid injury to the plants.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a disk cultivator, showing the invention applied thereto. Fig. 2 is a detail view of the guiding attachment.

Corresponding and like parts are referred to in the following description and indicated in the several views of the drawings by the same reference-characters.

The cultivator illustrated is of ordinary construction and is shown so as to make clear the application and utility of the invention. The beams 1, bearing the cultivating devices 2, are supported in any of the usual ways so as to admit of their lateral movement for the purpose of shifting the cultivating devices to avoid injury to the plants when the cultivator is in operation.

The attachment or guiding mechanism consists of a rock-shaft 3, journaled near its front end in a tongue-clip 4 and near its rear end to a hanger or bracket 5, and is provided at its front end with a crank 6 and at its rear end with a sway-bar 7. The sway-bar 7 is within convenient reach of the driver's seat 8 and is intended to receive the feet of the driver and form a rest. The end portions of the sway-bar are slightly depressed, and its terminals are bent upwardly to prevent the feet of the driver from slipping off when the sway-bar is tilted for guiding the cultivating devices. A link 9 connects the crank 6 with the beams 1. Hence when the shaft 3 is turned in its bearings the beams are moved laterally according to the direction of movement of the crank and sway-bar, thereby enabling the driver to shift the cultivating devices laterally, so as to prevent injury to the plants and enable the rows to be followed and properly cultivated. The tongue-clip 4 and hanger 5 are convenient means for connecting the attachment to the cultivator, and equivalent devices may be substituted therefor as occasion may require.

The particular means for connecting the crank 6 with the beams 1 are not essential to the spirit of the invention and will depend largely upon the character of the implement to which the attachment is applied. However, for the sake of illustrating the application of the invention the beams 1 are shown as connected at their front ends to the horizontal portions of an arched bar 10, and these horizontal portions are connected with the axle 11 by means of stay or brace rods 12, and the link 9 connects the crank 6 with a side member of the arched portion of the bar 10.

Having thus described the invention, what is claimed as new is—

1. In an agricultural implement provided with laterally-movable beams bearing cultivating devices, the arched bar 10 connecting the front ends of the beams, the longitudinally-arranged rock-shaft 3 having its front end provided with a crank-and-link connection with the bar 10, which connection works within the arch of said bar, and a sway-bar 7 at the other end of the rock-shaft, said sway-bar being within convenient reach of the driver to admit of the cultivating devices being guided solely from the driver's seat, substantially as described.

2. In an agricultural implement provided with laterally-movable beams bearing cultivating devices, the combination of a bar connecting the said beams, with a longitudinally-arranged rock-shaft having its front end connected with the said bar and suspended from the axle of the implement, and a rigid sway-bar secured to the other end of the rock-shaft and arranged within convenient reach of the driver's seat to admit of the cultivating-beams being guided solely by the feet of the driver, substantially as described.

3. In an agricultural implement provided with laterally-movable beams bearing cultivating devices, the combination of a bar connecting the said beams, a rock-shaft, a sway-bar secured to the rock-shaft and within convenient reach of the driver's seat to admit of the cultivating devices being guided solely by the feet of the driver, a crank applied to the rock-shaft, and a link connecting the crank with the bar coupling the beams, substantially as set forth.

4. In an agricultural implement provided with laterally-movable beams, the combination of a bar connecting the said beams, brace-rods connecting the terminals of the coupling-bar with the axle of the implement, a rock-shaft, a sway-bar having connection with the rock-shaft and adapted to receive the feet of the driver, a crank applied to the said rock-shaft, and a link between the crank and the bar connecting the cultivator-beams, substantially as set forth.

5. In combination, an arched bar, beams having connection with the horizontal portions of the arched bar and bearing cultivating devices, brace-rods connecting the extremities of the arched bar with the axle, a rock-shaft journaled in bearings applied to the frame of the machine and having a crank, a link connecting the said crank with a side member of the arched bar, and a sway-bar applied to the rock-shaft and having its terminals bent and accessible from the driver's seat to form a foot-rest and admit of the said beams being guided by means of the feet of the driver, substantially as and for the purpose set forth.

In testimony that I claim the foregoing as my own I have hereto affixed my signature in the presence of two witnesses.

JOHN WILSON.

Witnesses:
G. W. HARRIS,
E. R. PRECIOUS.